Figure 1:
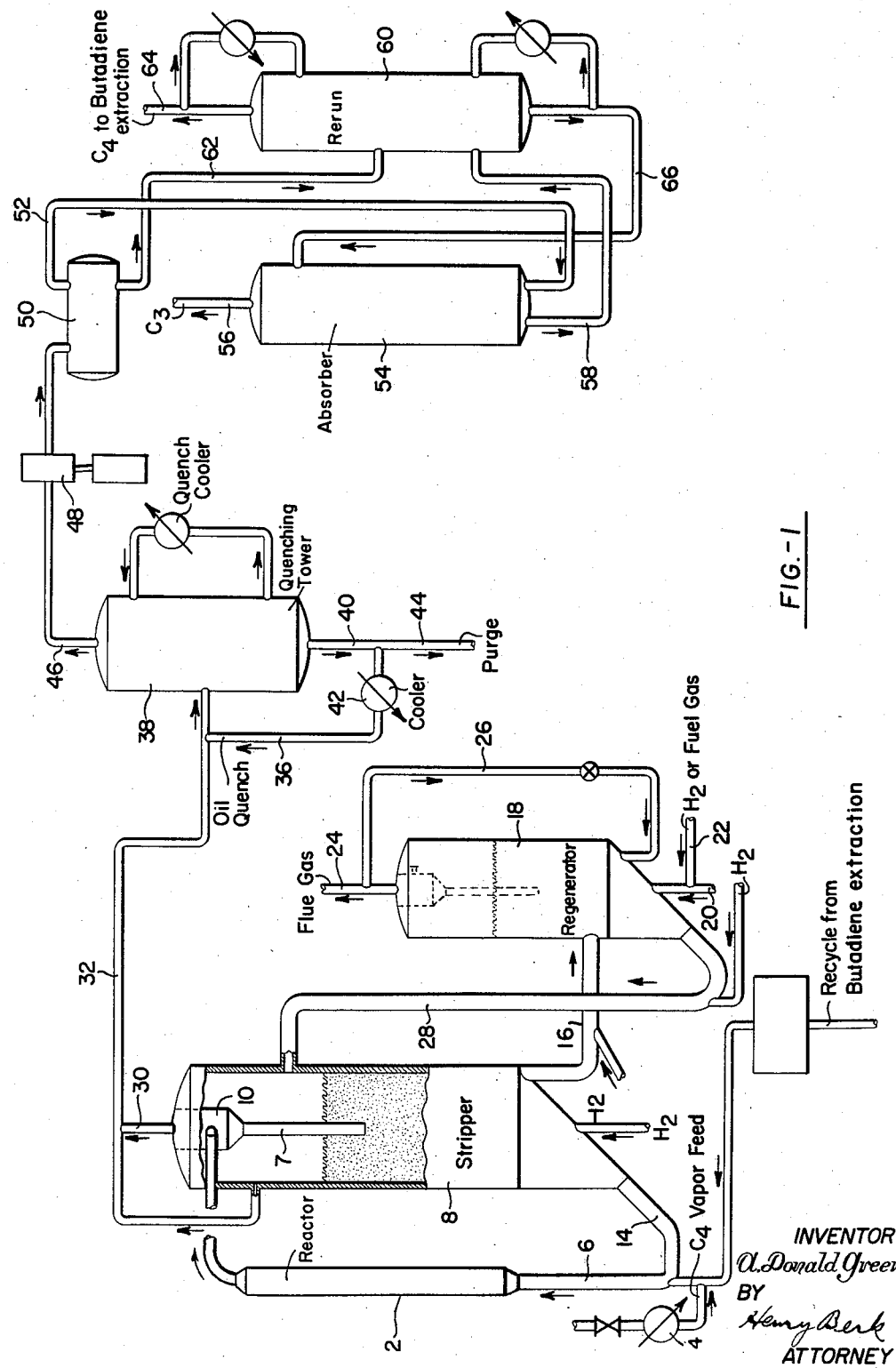

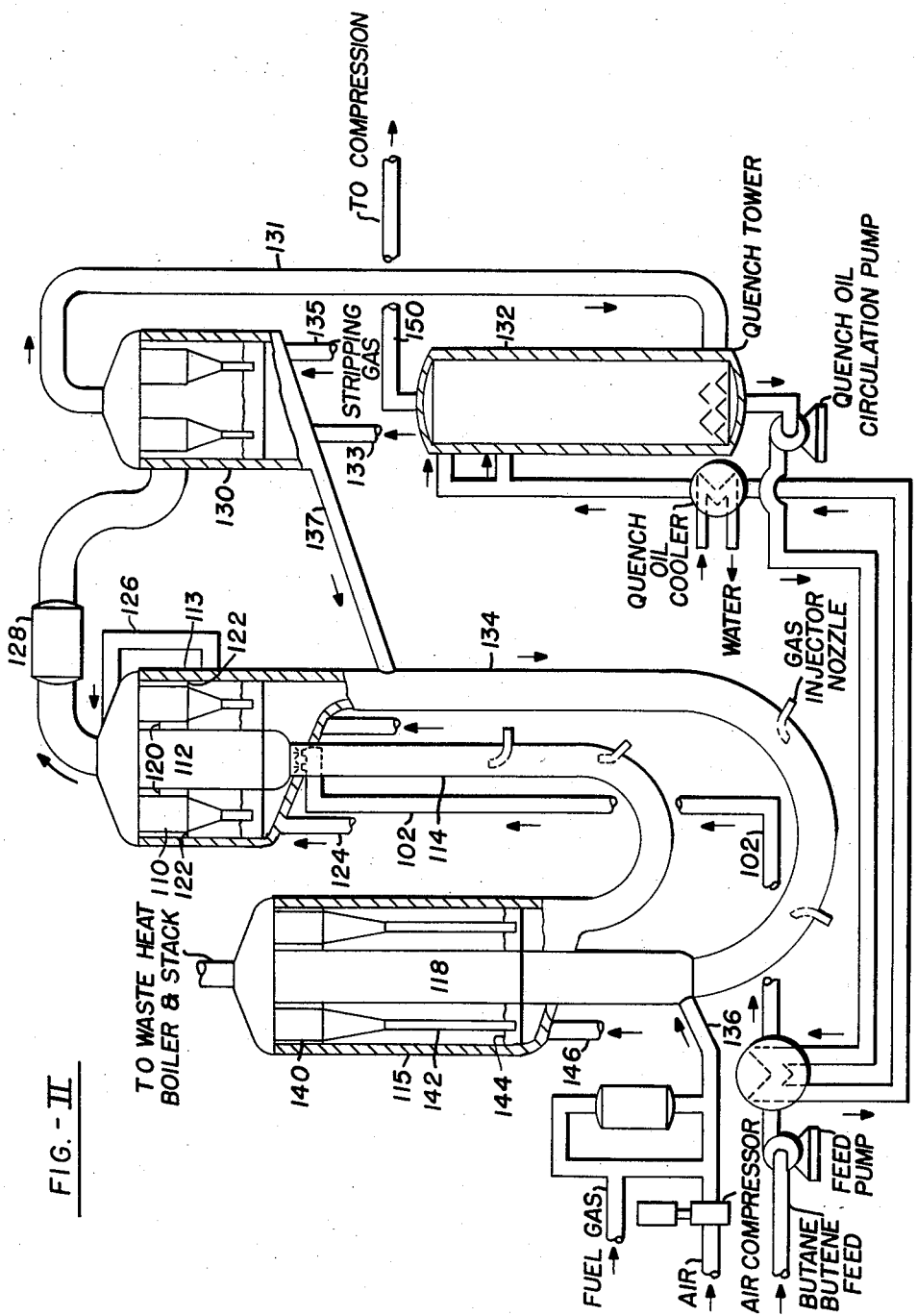

United States Patent Office 2,889,383
Patented June 2, 1959

2,889,383

DEHYDROGENATION PROCESS

A Donald Green, Cranford, N.J., assignor to Esso Research and Engineering Company, a corporation of Delaware Application April 16, 1954, Serial No. 423,799

5 Claims. (Cl. 260—680)

The present invention is directed to a method for dehydrogenating hydrocarbons. More particularly, the present invention is directed to a process for dehydrogenating normally gaseous and low-boiling paraffins, isoparaffins, or olefins into the corresponding olefins and/or diolefins. Still more particularly, the present invention relates to a dehydrogenation process of particular effectiveness and efficiency making possible a one-step conversion of paraffins to diolefins.

Prior to the present invention it has been conventional to dehydrogenate paraffins to mono-olefins and olefins to diolefins in the presence of catalysts. Such catalysts may comprise mixtures of magnesium oxide, an iron group metal oxide, and an alkali or alkaline earth promoter, as well as a group I, II or III metal oxide stabilizer. For example, the dehydrogenation of normal or iso butane to the corresponding butylenes is carried out commercially generally by two methods. One of these involves the use of catalyst in tubes of relatively small diameter, which are heated on the outside to supply the endothermic heat of dehydrogenation. In another process, the catalyst is in the form of a bed. Both of these processes are cyclic in nature, it being necessary to regenerate the catalyst frequently by burning the carbon off the catalyst. In the latter process, the heat capacity of the bed is used to furnish the heat of dehydrogenation, the bed temperature dropping during the "make" period.

In the dehydrogenation of normal butylenes or n-butane to butadiene, one process employed extensively commercially involves the use of a bed of steam-resistant catalyst operating with a very high mol ratio of steam to butylenes. This high ratio has been found necessary from thermodynamic considerations for reducing the partial pressure, and also serves to provide sufficient heat capacity to supply heat for the dehydrogenation reaction so that a reasonable conversion, to the extent of 20 to 40% can be obtained. In another process, butane or butylenes are dehydrogenated with catalyst in tubes of small diameter, with the heat furnished indirectly by heating the tubes. Alternately, the catalyst may be in the form of a bed with the heat of reaction being supplied by the sensible heat of the bed. In both these cases steam-sensitive catalyst are usually employed, so that the low partial pressure is obtained by operating under a vacuum. The first of these processes is costly, for it requires the handling of very large amounts of diluent steam. The latter two processes are costly because of the high cost of the reactors and the accompanying problems in obtaining low enough pressure drop through the catalyst bed. In addition, these processes are cyclic in nature and require frequent catalyst regeneration with accompanying complex timing and flow control valve equipment. For example, the fixed bed process may require seven reactors with three reactors being on stream, three on regeneration, and one on purge operation. The length of time on reaction or regeneration is of the order of 6–10 minutes. This results in frequent flow changes. The upper temperature in a fixed bed is usually limited by coke deposition on the catalyst even though higher temperatures may be desirable to give yield advantages.

A significant step forward in solving the problems enumerated above, particularly in those installations employing fixed bed operation, was the introduction of the fluid solids type of operation. This technique, which is particularly well-known in the cracking of petroleum art, involves the maintenance of a dense bed of finely-divided solids fluidized by upward-flowing gas streams in a reactor. Customarily known as a hindered settler type bed having a reasonably well-defined upper level, it affords an excellent means of temperature control and intimate mixing and contact of catalyst with reactants. Furthermore, it permits continuous regeneration of catalyst by withdrawal of a sidestream for burning off the deposited carbon in a regenerator vessel; concomitantly, the heat necessary for the reaction is supplied by return of the heated regenerated catalyst, thus making unnecessary the use of indirect heating through tubes.

Desirable and advantageous as it is to apply the hindered settler technique to the dehydrogenation of paraffins and olefins, the process has certain limitations when employed in this service. Chief among these are the difficulty of maintaining a uniform short contact time of the gas or vapor being dehydrogenated with the catalyst, and the high degree of mixing and consequent uniformity of composition in the bed when employing a hindered settler reactor. For example, velocities in a hindered settler are limited to a velocity less than that which would entrain the catalyst. In order to maintain a desirable short contact time of the order of 0.2–1.0 seconds, would require use of a low (length/diameter) ratio which would in general not be practical. It is also highly advantageous to carry out dehydrogenation operations at low partial pressures of hydrocarbons, particularly when it is desired to obtain good yields of dienes.

It is, therefore, the principal object of the present invention to set forth a process for dehydrogenating paraffins and/or olefins employing a fluidized type of operation which overcomes the aforesaid disadvantages and difficulties.

It is a further object of the present invention to set forth a process for dehydrogenating hydrocarbon gases and low boiling liquids which, employing a fluidized type of operation, may be carried out under reduced pressure, and which enables the use of higher temperatures than hitherto found feasible.

It is a still further object of the present invention to set forth a novel process for converting paraffins into diolefins in one step or stage.

Other and further objects and advantages of the present invention will be pointed out in the subsequent description.

The method of this invention involves carrying out a catalytic vapor phase dehydrogenation reaction continuously wherein the catalyst, maintained at a critically controlled reaction temperature, is carried in suspension concurrently with a stream of reactant vapor through the reaction zone for a uniform short reaction period, then is abruptly disengaged from the resulting gaseous reaction products, reactivated, and returned at the desired temperature to the reaction zone.

In accordance with the present invention, therefore, dehydrogenation reactions are carried out under conditions wherein vapors are contacted with active catalysts at the required reaction temperature for a limited uniform period of relatively short duration and the vaporous products formed are abruptly disengaged from the catalyst. These requirements are not satisfactorily met in the conventional fluidized catalyst systems because of entrapment and turbulence which result in recirculation of vapor reaction products and spent catalyst in the reaction zone, and because of upper velocity limitations in this type of fluidized bed.

The reaction is most advantageously carried out in a reactor of relatively small diameter, best designated as a transfer line reactor. By use of the latter, not only are there realized the advantages of fluid catalysts generally in supplying high heat capacity and good heat transfer; the transfer line reactor also permits thus a uniform short reaction time, i.e., every catalyst particle is in contact with the reactant vapors to the same extent as every other particle whereas in the hindered settler type of operation, because of turbulence and mixing, only an average uniformity of contact time is realized. Back mixing of products is largely eliminated. This achieves a material yield advantage. Rapid quenching is also realized in a transfer line, a factor of great importance in the production of diolefins such as butadiene. In a hindered settler, a dilute or dispersed phase exists above the bed. Undesirable thermal cracking and polymerization may occur here since the product is at a high temperature, not in contact with catalyst. Furthermore, a transfer line reactor makes use of vacuum operation more practicable than with conventional fluidized and solid beds with resulting high pressure drop. In brief compass, therefore, a hydrocarbon vapor is injected into a transfer line reactor, thereby providing circulation of fluidized catalyst which flows from a stripper. The solids flow and entering temperature level is sufficient to provide the heat capacity to supply heat of dehydrogenation and to supply any sensible heat required to bring the feed to reaction temperature. The solids-gas mixture is separated in a centrifugal separator so designed as to give minimum contact time, the solids passing through a dip-leg into the stripper vessel, while the gas is taken off the top and quenched immediately.

Adsorbed and entrained reaction products are removed from the catalyst in the stripper, but this is not always essential. The stripper may contain stages obtained by use of baffles, bubble cap trays, or the like. A convenient gas for stripping is hydrogen from the process. Stripped catalyst is withdrawn continuously and fed to the regenerator, using hydrogen or fuel gas to supply a heat and fluidizing medium. Similarly, regenerated catalyst is fed back continuously to the system, for example, to the top of the stripper or to the reactor. Carbon is burned off in the regenerator by use of air, preferably with a flue gas circulation system, so that the oxygen concentration at any one point is not too high. Heat of dehydrogenation is supplied by introducing spent hydrogen or fuel gas into the regenerator, or burning it with air before introduction into the regenerator and by burning carbon on the catalyst in the regenerator.

The pressure in the regenerator is maintained somewhat above atmospheric pressure. When vacuum is used in the transfer line reactor, the difference in height between the regenerator and the solids level in the stripper must be such as to permit flow of catalyst into the regenerator without breaking the seal.

One modification of the present invention may be suitably illustrated by Figure I, wherein $C_4$ fractions are dehydrogenated to butadiene. It is to be understood, however, that the invention is not confined to any particular dehydrogenation reaction or system. The invention is of greatest utility in the following applications: Dehydrogenation of (1) normal butylenes to butadiene; (2) n-butane to butadiene in a one-step process, or a two-step process without intermediate separation of butylenes; (3) n-butane to n-butylenes; (4) isobutane to isobutylene; (5) ethyl benzene to styrene; (6) isopentane to trimethylethylene; (7) trimethylethylene to isoprene; (8) one-step dehydrogenation of isopentane to isoprene; (9) dehydrogenation of paraffins and iso-paraffins in the naphtha boiling range to the corresponding olefins and diolefins.

Referring now to the Fig. I, the reaction tube 2 is a vertical tubular conduit of relatively narrow cross-section, into the bottom inlet of which is fed $C_4$ hydrocarbon preheated in fired coil heater 4, the vapors being passed into the reactor through line 6.

Preheating temperatures are in the range of 100° to 1150° F. Finely-divided catalyst from stripper 8 is suspended by the oncoming gas stream and carried upwardly through the tube, whose upper end discharges into cyclone or other type separator 10. Spent catalyst is disengaged abruptly from the vaporous product stream in separator 10 and drops downwardly through dip leg 7 into stripper 8, a vessel which may be equipped with baffles, bubble cap trays, and the like, to provide stripping in stages and adequate contact of gases and solids.

Stripping gas, such as spent hydrogen from the process is injected into the stripper 8 through line 12 to remove entrained vapors from the catalyst, and also to maintain a fluidized solids bed of catalyst within the vessel. This bed provides a pseudo-hydrostatic pressure, thus acting as a standpipe, and serves not only to provide catalyst flow to the transfer line reactor through line 14 but also serves to provide catalyst flow to regenerator 18 through line 16. It should be noted that the arrangement shown in the figure provides for circulating catalyst from the stripper to either the regenerator or to the reactor. However, it may also be desirable to circulate all catalyst to the regenerator from the stripper, and return the catalyst from the regenerator directly to the reactor.

The catalyst enters reactor 2 through line 14 at a rate sufficient to provide the desired endothermic heat of reaction. The temperature of the preheated gas entering line 6 is 100°–1150° F. while the catalyst in line 14 is at a temperature of 1150°–1450° F. The reaction, therefore, can be carried out at an average temperature of 1150°–1450° F. The vapor velocity is regulated between 10 and 100 ft./sec. in order to maintain a catalyst density in reactor 2 of from 0.5–10 lbs./ft.$^3$ when the catalyst particle size is 80–400 mesh and also to provide a vapor residence time of from 0.1 to 1 sec. When dehydrogenating butane or butylenes to butadiene, a pressure of 100–400 mm. Hg is maintained in reactor 2.

An important feature of the present invention is the maintenance of a vacuum upon the system. This is accomplished by use of compressors on the exit products.

When dehydrogenating butane or isobutane to the corresponding butylenes, the pressure at the end of transfer line reactor 2 may be atmospheric or even somewhat above. However, when dehydrogenating butylenes or butane to butadiene, a higher temperature and a pressure of about 100 to 400 mm. Hg is maintained. Steam diluent may also be employed instead of vacuum in the dehydrogenation of butylenes to butadiene, but the invention realizes its greatest utility by dispensing with the necessity of generating and handling large quantities of steam and in allowing direct one-step dehydrogenation of butane to butadiene.

Another important feature of the present invention resides in the continuous withdrawal of part or all of the catalyst for regeneration by burning of accumulated carbon and for providing the necessary heat of dehydrogenation. Used catalyst from stripper 8 is withdrawn through aerated line 16 and passed to regenerator vessel 18, wherein the catalyst being regenerated is maintained either as a dense, fluidized bed or as a transfer line bed by upwardly flowing regeneration gases, such as air, admitted through line 20. Since the heat released by combustion of the carbonaceous deposit on the catalyst generally is not sufficient to heat the catalyst to 1150–1450° F., a fuel gas, such as methane, ethane, or spent hydrogen may be advantageously introduced through line 22 and burned in the regenerator to supply the additional heat requirement. The gases resulting from the combustion of carbon on the catalyst, and from the fuel gases, are withdrawn overhead through line 24. A portion of these gases may be advantageously recirculated to the regenerator through line 26, so that the oxygen concentration at any one point is not too high.

The velocity of the upwardly flowing gases in the regenerator is adjusted so as to maintain a catalyst fluidized bed density of 25–40 lbs./ft.$^3$ In general, the regenerator is operated at a superatmospheric pressure of 1–5 lbs./in.$^2$ The heated regenerated finely divided catalyst solids are returned to the stripper vessel 8 through line 28 by pressure exerted by the pseudohydrostatic head of the dense bed maintained in regenerator 18. Solids flow from regenerator 18 and the regenerated solids may be returned to vessel 8 at a point above the upper layer of the dense fluidized bed maintained in that zone.

Returning now to the transfer line reactor, the gas-solids mixture is separated in centrifugal or cyclone separator 10 so designed as to give minimum contact time of gases with hot solids, and the gas is withdrawn overhead through line 30 and immediately quenched. As quenching fluid there may be employed water or an oil.

The quenching and recovery system are conventional and form no part of the present invention. Thus, referring again to the drawing, hot gases withdrawn from reactor 2 via lines 30 and 32 are immediately quenched by a cold stream of a suitable quenching medium such as a light hydrocarbon oil, or other liquid admitted into line 32 via line 36. The quenching medium and the dehydrogenation products are passed to quenching tower 38, a tower of conventional design. In 38 a partial separation is effected between the reaction products and the quenching medium, the latter being withdrawn downwardly through line 40, and recycled to line 32 via cooler 42 and line 36. A small purge stream may be withdrawn through line 44 for the purpose of removing polymeric material formed in the reaction. Overhead from tower 38 is withdrawn a vapor stream 46 at a temperature of about 100° F. and pressure of about 2 p.s.i.a. This stream comprises the reaction products and gaseous by-products formed in the course of the reaction such as methane, hydrogen and the like, and also, a certain amount of vaporized quenching medium.

The vapor stream is thereafter compressed in compressor 48 and cooled to about 100° F. to liquify a fraction of the reaction products formed in reactor 2, and thereafter passed to settling drum 50. Overhead, through line 52, is withdrawn nonliquified hydrocarbonaceous material which is passed to absorber tower 54. In the latter, conditions of temperature and pressure are maintained such that the hydrocarbons boiling in the range of C$_3$ and lower are withdrawn overhead through line 56 whereas higher boiling hydrocarbons are absorbed in the scrubbing medium which may be any suitable hydrocarbon oil. The fat oil is withdrawn from the bottom of absorber 54 through line 58 and is passed to rerun tower 60. To the same unit there is also passed, via line 62, the liquid product from settling vessel 50. Rerun tower 60 is provided with reboiling means, and the scrubber oil is separated from hydrocarbon reaction product. The latter is withdrawn as the heads product through line 64 and passed to conventional recovery apparatus. Thus, the desired product, i.e. butylene or butadiene may be recovered from this stream by conventional means and techniques such as extraction with copper salt (as butadiene). If butylenes are the desired product, they can be recovered by azeotropic or extractive distillation, and, in the case of isobutylenes, by absorption and regeneration from sulfuric acid all in a manner known per se. The lean absorber oil is withdrawn downwardly from tower 60 via 66 and recycled to absorber tower 54. A small purge stream may be continuously or intermittently withdrawn to remove polymer formed during the absorption and stripping operations.

As known to those familiar with the art, the types of catalyst which may be employed for dehydrogenation are varied, including nickel, alumina, compositions of alumina with chromium, tungsten or molybdenum, metallic oxides such as copper, cobalt, nickel and the like; a particularly outstanding catalyst is one consisting of a major portion of magnesium oxide, a minor portion of iron oxide, a promoter such as potassium carbonate, and a stabilizer such as CuO.

Though a dense fluid bed type of catalyst regeneration vessel and system has been shown, it is understood that this may advantageously be replaced by a transfer line type of operation similar to that employed in the dehydrogenation stage itself. Such a system has the advantage of being able to effect regeneration at reduced pressure, not readily attainable with dense bed type of operations.

A particularly preferred embodiment of the present invention is disclosed in Figure II, wherein there is shown a means whereby the high temperature residence time of the vapor-catalyst stream leaving the reactor may be radically reduced, and which embodiment has other operation advantages, particularly adapted to the short-time vacuum type of transfer line reactor system of the present invention. In the catalytic vacuum dehydrogenation of n-butane to butadiene in a transfer line reactor, the catalyst and product vapor are separated in cyclones. However, since the reaction is carried out at low pressure, numerous cyclones in parallel are required to handle the large vapor volume. It is customary in fluid operations to enclose the cyclones in a separate vessel, for if an enclosure were not used, a hole resulting from erosion in one of the cyclones would cause plant shutdown. In order to avoid expensive manifolding and piping, the vapor catalyst stream is ordinarily fed to this vessel, where it seeks its own path through the cyclones. This technique has the disadvantage, however, in the present operation in that the vapor residence time above the catalyst bed in such vessel would be large compared to the reaction time, and may be sufficient to cause undesired thermal cracking reactions to take place.

In Figure II is shown a novel and particularly suitable combination arrangement of the transfer line reactor and the cyclone system which provides for a minimum vapor residence time before quench, minimizes piping and manifolding costs, and permits plant operation to proceed even if holes are eroded in several cyclones.

Turning now to Figure II, the latter shows in combination both a transfer line reactor vessel 112 and transfer line burner or regenerator vessel 118. Reactor 112 is located within housing 113, and regenerator 118 within housing 115. As in the case in Figure I, reaction tube 112 is a vertical tubular conduit of relatively narrow cross-section. The feed is passed into the system through line 102, while the heated regenerated catalyst is passed upwardly through duct 114. Passage of the regenerated catalyst from vessel 115 into reactor 112 is made possible by the difference in pressures existing in those two zones, the burner or regeneration vessel being maintained at approximately atmospheric pressures whereas the reactor vessel is maintained preferably under vacuum, particularly when diolefins are being prepared.

In accordance with this embodiment of the invention, the spent catalyst is disengaged abruptly from the vaporous product stream in the cyclone separator system shown in the upper portion of housing 113. A series of cyclone separators 110, numbering from four to eight or more, are arranged about the circumference of reactor 112 with entrance ducts 120 at or near the top of the reactor. Cyclones 110 are supported by a plate 122 which extends across housing 113, which housing encloses both the reactor 112 and cyclones 110. If this plate were not used, the residence time and subsequent thermal cracking of any vapor escaping from a hole in one of the cyclones would be appreciable due to the large free space available above the bed. However, a tight seal between the plate 122 and cyclones 110, and the plate 122 and reactor 112 is not necessary because of the gas stripping in the lower chamber which is removing small amounts of product carried into the catalyst bed from the cyclones. For this purpose, stripping gas is introduced through line 124. The major part of this stripping gas is combined with product vapor leaving the cyclones 110 by means of line 126. Any gas leakage around the plate and into the upper portion of vessel 113 can exit into the manifold at the top of the vessel and through a cyclone in the upper chamber whose entrance duct opens into the free space and not into the top of the reactor. This cyclone also removes solids from any vapor blowing through an eroded hole in any of the cyclones.

Vapor product at a temperature of about 1150° F., and which may still contain minor amounts of unseparated catalyst, is passed through waste heat boiler 128 where the temperature can be reduced to prevent thermal degradation of butadiene product and through secondary cyclones in vessel 130. In vessels 113, 115 and in 130 the vapor products and suspended solids pass through the cyclone system in parallel flow. Overhead from vessel 130 the vapor reaction products are passed via line 131 to quench tower 132 where the product is quickly quenched to a temperature of about 110° F. by quench oil in a manner previously described.

Returning now to outer vessel 113, disengaged catalyst passes downwardly through duct 134 and into burner vessel 118. Similarly, disengaged catalyst from vessel 130 flows downwardly through lines 137 and 134 to vessel 118. The latter is also of the transfer line reactor type, but is operated at atmospheric pressures rather than under a vacuum. Air is passed in through line 136 and disengaged regenerated catalyst and combustion gases are passed into cyclone system 140 which may be of the type described above, though this is not as essential in the regeneration system as in the reactor. Disengaged catalyst passes downwardly through dip legs 142 to form a fluidized bed within vessel 115, having an upper level 144. An aeration and fluidizing gas necessary for the maintenance of a fluidized bed may be admitted through line 146. Similarly, catalyst withdrawn through cyclones 110 and the cyclones in vessel 130 are also maintained as fluidized beds in the respective vessels by aeration and stripping gases admitted through lines 124, 133 and 135. The quenched reaction products are withdrawn overhead from tower 132 through line 150, and are then compressed and further treated in the manner previously described in connection with Figure I.

The invention has been detailed above in an embodiment wherein low-boiling hydrocarbons such as butane or butenes are dehydrogenated. However, the invention is also adapted to the dehydrogenation of hydrocarbons present in such materials as virgin naphthas. These naphthas contain normal paraffins, isoparaffins, naphthenic hydrocarbons and even aromatics. By catalytic dehydrogenation, the paraffins and isoparaffins are partially converted to olefins. In the case of the naphthenic rings, the six-carbon rings are partly dehydrogenated to aromatics, while the five-carbon rings would be partially isomerized to six-carbon rings and then dehydrogenated to aromatics. A main objective, however, is to convert paraffins and isoparaffins to olefins which have a much higher octane number than the original hydrocarbons. The dehydrogenation operation can be conducted on a wide-cut virgin naphtha, or on narrow cuts obtained by fractionation.

Catalytic dehydrogenation of virgin naphthas and of paraffinic and iso-paraffinic compounds in the same boiling range has not, in the past, been very successful, low yields being obtained. In the past, fixed bed catalyst reactors have been used, which involve such a long contact time that, at the temperatures needed for dehydrogenation, excessive cracking and fragmentation of the original hydrocarbons take place.

The present invention accomplishes this dehydrogenation with a fluidized catalyst in a transfer line reactor which enables very much shorter contact times. Also, it is possible to use higher temperatures than feasible in a fixed bed reactor, which is desirable from the thermodynamic standpoint and leads to higher conversion to olefins. Also, in the fixed bed catalytic process, carbon builds up on the catalyst and the latter must be intermittently burned off. This requires large amounts of excess air to prevent temperature runaways. However, in the continuous fluid catalyst technique herein proposed, all or part of the catalyst can be withdrawn continuously from the reactor, oxidized in a separate vessel using a much smaller amount of air to remove carbon, and returned continuously to the reactor.

In the treatment of naphtha reactor pressures only slightly above atmospheric are preferred from the economic standpoint, although superatmospheric or vacuum can be used. Likewise, it would be possible to operate with an inert diluent to reduce the partial pressure of the reactants. Theoretically, the lower the partial pressure of the reactant, the more favorable is the thermodynamic equilibrium as regards olefin formation. However, in practice, atmospheric pressure without a diluent is probably the most economical operation.

The process may be operated on a once-through basis for improving octane number of virgin naphtha or of selected fractions. By separating the olefins formed from the unreacted hydrocarbons, as by extractive distillation, a recycle process can be employed to obtain high ultimate conversion.

What is claimed is:

1. An improved process for dehydrogenating $C_4$–$C_5$ paraffins to diolefins which comprises suspending finely divided hot dehydrogenation catalyst, preheated to a temperature of from about 1150–1450° F., in a vapor stream of said paraffins in a vertical transfer line reaction zone of relatively narrow cross section, maintaining subatmospheric pressures of 100 to 400 mm. Hg in said zone, passing the suspended catalyst uniformly and substantially at the same velocity as the reactant vapor upwardly through the reaction zone for a contact period of less than 1 second at a reaction temperature of about 1150° to 1450° F., maintaining a catalyst density in the range of about 0.5–10 lbs./cubic foot therein, discharging resulting vapor products with the suspended catalyst from the end of the reaction zone into a separation zone and settling the suspended catalyst from the vapor products, immediately quenching the separated vapor products and recovering the diolefin product therefrom, passing the separated catalyst in dense phase from the separation zone to a regeneration zone maintained at somewhat superatmospheric pressure and disposed at a level sufficiently below the settled catalyst mass in the separation zone to permit flow of catalyst into the regeneration zone while maintaining a fluid seal between the two zones, continuously regenerating said catalyst as a fluidized solids dense bed in the regeneration zone, supplying a combustible gas and a combustion-supporting gas to the regeneration zone, and returning hot regenerated catalyst to the reaction zone to supply the endothermic heat of dehydrogenation.

2. A process according to claim 1 wherein a portion of the catalyst separated from the reaction vapors is recycled from the separation zone to the reaction zone without intervening regeneration.

3. A one-step process for dehydrogenating a n-butane feed into butadiene which comprises passing said feed preheated in the range of 100° to 1150° F. upwardly into and through a vertical transfer line reaction zone maintained at a subatmospheric pressure of about 100 to 400 mm. Hg, suspending a finely divided dehydrogenation catalyst preheated to a temperature of about 1150° to 1450° F. in said n-butane feed in a sufficient amount to maintain a temperature of about 1150° to 1450° F. in said reaction zone, passing said catalyst suspended in said feed uniformly and substantially at the same velocity as the vaporized feed through said reaction zone at a vapor velocity of 10 to 100 ft./sec. and a vapor residence time of 0.1 to 1 second in said zone, maintaining a catalyst density of 0.5 to 10 lbs./cubic ft. in said zone, discharging resulting vapor products and suspended catalyst from the upper end of said zone into a separation zone, settling the catalyst from the vapor products, immediately quenching the separated vapor products, continuously passing separated contaminated catalyst in dense phase from the separation zone to a dense fluidized bed in a regeneration zone having an upper dense bed level sufficiently below the solids in the separation zone to permit maintenance of a fluid seal between the regeneration and separation zones, passing a combustible gas and a combustion supporting gas to the regeneration zone, maintaining a fluidized bed density of about 25 to 40 lbs./cubic ft. and a superatmospheric pressure of about 1 to 5 lbs./sq. inch in the regeneration zone, withdrawing hot regenerated catalyst from the regeneration zone, and returning at least a major portion of the regenerated catalyst to the transfer line reaction zone to supply the heat of dehydrogenation.

4. The process of claim 3 wherein said catalyst comprises chromia and alumina.

5. In the process for making butadiene by catalytic dehydrogenation of normal butane, the improvement which comprises suspending a chromia-alumina dehydrogenation catalyst in a vapor stream of the butane, maintaining said catalyst suspended for a uniform short period of time no more than 1 second in duration under subatmospheric pressure of about 100 to 400 mm. Hg and a temperature between 1150° and 1450° F. while moving said catalyst concurrently with the hydrocarbon vapor through a transfer line reaction zone, thereafter separating the catalyst from the converted hydrocarbon vapors, recovering butadiene from said converted hydrocarbon vapors, recycling a portion of the resulting separated catalyst to the reaction zone without intervening regeneration, passing another portion of the separated catalyst to a regeneration zone where carbonaceous contaminants are burnt off, and recycling the resulting regenerated catalyst to the reaction zone.

References Cited in the file of this patent

UNITED STATES PATENTS

| | | |
|---|---|---|
| 2,403,375 | Kassel | July 2, 1946 |
| 2,410,284 | Gunness et al. | Oct. 29, 1946 |
| 2,414,962 | Mattox | Jan. 28, 1947 |
| 2,418,003 | Angell | Mar. 25, 1947 |
| 2,433,800 | Watson | Dec. 30, 1947 |
| 2,437,334 | Roetheli | Mar. 9, 1948 |
| 2,672,490 | Roetheli | Mar. 16, 1954 |